Patented Apr. 18, 1944

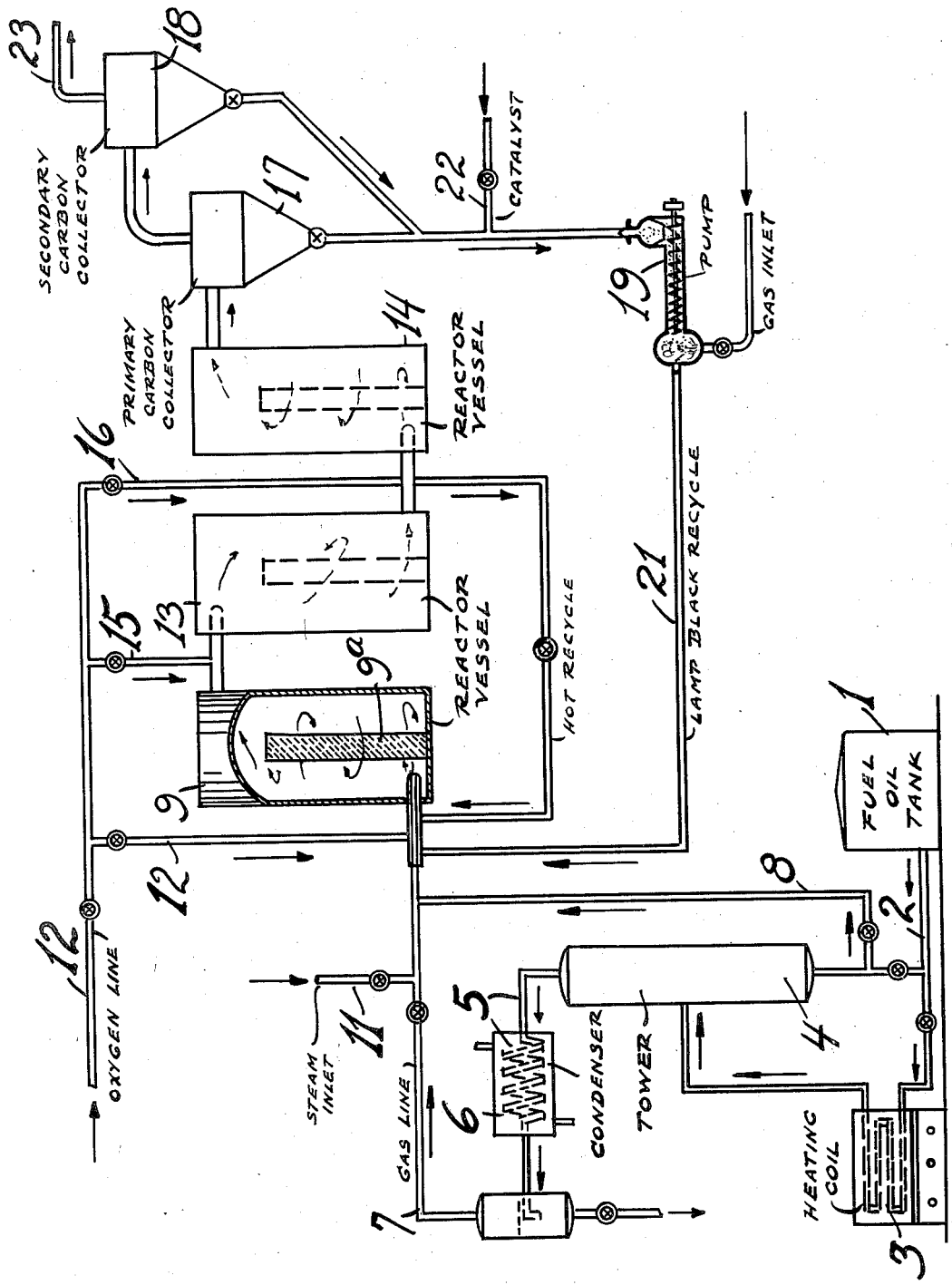

2,346,754

UNITED STATES PATENT OFFICE 2,346,754

FUEL OIL GASIFICATION

Charles E. Hemminger, Westfield, N. J., assignor, by mesne assignments, to Standard Catalytic Company, a corporation of Delaware Application December 9, 1939, Serial No. 308,368

5 Claims. (Cl. 48—215)

The present invention relates to an improved method for generating a gas rich in hydrogen from heavy hydrocarbon materials, such as crude oil residues, pitch and the like. The invention will be fully understood from the following description.

The drawing is a diagrammatic view in elevation of an apparatus which may be used for carrying out the process.

Recent developments in synthetic chemical technology have made it desirable to produce large volumes of hydrogen or hydrogen containing gases at low cost, and it has been found that the petroleum refiners have at their disposal considerable quantities of heavy carbonaceous materials such as crude oil residues, pitches, cracked tars and the like, which may be used for the purpose and which may serve as sufficiently cheap raw materials. The present invention presents a method for converting such materials by inexpensive means into gases rich in free hydrogen.

Turning to the drawing, reference numeral 1 represents a tank containing heavy carbonaceous material which is pumped through pipe 2, to a heating coil 3, where the temperature is raised to a decomposition range say above 750° F. The cracked material is discharged into a tower 4 from which any naphtha produced and fixed gases are withdrawn, by a pipe 5. The naphtha and other normally liquid constituents are condensed at 6 and withdrawn from the gases which are taken off by a pipe 7 and passed to a reaction vessel 9.

The cracked residue from the tower 4 is then withdrawn through line 8 and discharged into the reaction vessel 9 where it joins the fixed gas. If the original carbonaceous material is an already heavily cracked residue, it can be passed directly from the tank 1 to pipe 8 and reactor 9 as shown in the drawing.

The reaction chamber 9 is a large cylindrical vessel lined with refractory material and capable of withstanding temperatures of the range of 2,000 to 3,000° F. It may be constructed as a hollow shell or preferably contains a solid refractory core 9a in the center about which the materials pass and is provided with a tangential inlet tube 10 through which the carbonaceous material is introduced in a rapidly swirling motion, together with steam and an oxygen-containing gas, by means of pipes 11 and 12 respectively. The reactions which take place in the reaction chamber are complicated, but consist in the production of hydrogen and the cracking of heavy residue so that free, solid carbon is released. The velocity of the gas within the reaction vessel is sufficiently high to prevent the accumulation of the carbon and it is swept along from the reactor 9 with the gases to the following portions of the apparatus.

The volume of oxygen introduced as above is adjusted carefully so as to burn a portion of the carbonaceous material and thus produce the high reaction temperatures mentioned above, but it will be understood that the amount of oxygen is considerably less than required for complete combustion of the carbonaceous substances. The amount of oxygen introduced at this point is approximately 0.35 pound per pound of carbonaceous material. It is contemplated that air may be employed as the oxygen-containing gas where a considerable quantity of nitrogen in the final gas mixture is not objectionable, but where the nitrogen content in the final gas is to be maintained at a low figure, pure oxygen will be required.

The amount of steam added at the inlet of the reactor line may vary from about .3 to 3.0 pounds per pound of the carbonaceous material, which is an amount in excess of that required in addition to the oxygen supplied to the system to oxidize the carbon content of residue to $CO_2$ and thus release its hydrogen content along with that of the steam as free hydrogen.

While the process may be completed in a single reactor such as 9, it has been found desirable to conduct the gases through at least two, but preferably several additional reactors of which two, 13 and 14 are shown. These may be similar in detail to reactor 9 and are desirable in order to complete the reaction and to provide additional inlet for oxygen at pipes 15 and 16. The additional oxygen is less in amount than that originally added and is employed to maintain the temperature in the range from 2,000 to 3,000 and to burn the free carbon released from the gas, or at least a portion thereof.

The gas leaving the last of the reactors in the series is brought to a primary carbon collector 17 and thence to a secondary collector 18, from which the residual carbon is collected. This carbon may be drawn off for use as such or may be returned to the reactor for reuse. The carbon with or without additional amounts of carbon, coke, coal or the like, may be added to the pitch by a pipe 22 and pumped to the reactor in this way, or if desired, a solid pumping device, for example of the Fuller-Kenyon type, 19 may be employed with suspending gases which are introduced by a pipe 20 and the suspended solid is thus conveyed through a pipe 21 to the reactor 9.

In the above process the suspending gases may be inert gas such as nitrogen or hydrogen or hydrocarbon gases such as methane, ethane or propane or mixtures thereof, natural or cracked gases, and the temperature of reaction may be reduced by the addition of catalysts through the line 22. For this purpose, catalysts such as metallic iron, nickel or cobalt may be used or oxides of these metals, especially mixtures with difficultly reducible oxides of the II and III groups of the periodic system such as lime, magnesia, alumina and the like. The gas rich in hydrogen is taken off by pipe 23. It may be purified, for example desulphurized, or otherwise treated as may be required for the particular purpose for which it is to be used.

The gas produced by the above process is found to be rich in hydrogen and contains only a minor amount of $CO_2$ and hydrocarbons and a large percentage of CO. The nitrogen content may be very small if free oxygen is used instead of air, as mentioned above. A characteristic gas produced by this method has the following composition:

|     | Per cent |
| --- | --- |
| $H_2$ | 33.5 |
| CO | 55.0 |
| $CO_2$ | 6 |
| $CH_4$ | 4.0 |
| $N_2$ | 1.5 |

Such a gas is very desirable for catalytic production of hydrocarbons by the so-called Fischer synthesis, since the content of carbon monoxide is almost twice that of hydrogen which is necessary for a gas of this process, but this ratio can be varied as will be explained below.

The ratio of hydrogen to carbon monoxide can be adjusted by reacting the gas as produced above, or at least a portion thereof, with an excess of steam so as to convert a part of the CO into $CO_2$, using for example an iron or an iron-chromium catalyst. Additional hydrogen is, of course, generated during the course of this reaction. The $CO_2$ can be washed out with water under pressure or by agents such as sodium carbonate, sodium phenolate, triethanolamine and the like. In this manner, a gas containing over 90% hydrogen can be readily prepared.

While the above process is particularly interesting for the production of gases from heavy hydrocarbons, tars, pitches and the like in order to obtain gases with a high ratio of CO to hydrogen, it is contemplated that the process may be used to produce gases of relatively low ratio of CO to $H_2$ such as are desired in the production of ammonia synthesis gas and the like. This will be accomplished by employing hydrocarbon gas as feed, such as methane, which may be introduced through pipe 2 or through line 22, carrying suspended powdered catalyst, as described above. The catalyst will separate from the final gas in the separators 17 and 18, and may be returned for further reaction through line 21.

These several different operations are contemplated using heavy hydrocarbon residues alone, or together with hydrocarbon gas or hydrocarbon gas alone as the source of the carbonaceous material, depending on the composition of the gas desired.

The present invention is not to be limited to any theory of the mechanism of the reaction, nor to any particular form of apparatus, but only to the following claims in which it is desired to claim all novelty inherent in the process.

I claim:

1. A method of generating an oil gas containing hydrogen from heavy hydrocarbon residues which comprises passing said residue through a reaction zone, introducing steam and a free oxygen-containing gas into said reaction zone, limiting the amount of free oxygen introduced into said zone to effect a partial combustion of said hydrocarbon residue sufficient to maintain said reaction zone at a temperature which will rapidly decompose the unburned portion of the hydrocarbon residue into decomposition gases rich in hydrogen and containing free carbon, passing the stream of residue and gases through said reaction zone at a velocity sufficient to prevent substantial accumulation of carbon therein, removing decomposition gases containing free carbon from said reaction zone, separating the free carbon from the decomposition gases and returning said carbon to said reaction zone.

2. The method defined in claim 1 wherein the oxygen-containing gas is added at spaced points along the reaction zone.

3. The method defined in claim 1 wherein the reaction zone is divided into a series of reaction chambers and wherein an oxygen-containing gas is added to each of said reaction chambers.

4. A process for generating oil gas containing free hydrogen from heavy hydrocarbon residues which comprises initially subjecting said hydrocarbon residues to cracking treatment to produce a fixed gas fraction, an intermediate condensate fraction and a heavy, unvaporized pitch, passing the said fixed gas fraction and pitch through a reaction zone, introducing into said reaction zone a free oxygen-containing gas and steam, limiting the amount of free oxygen-containing gas introduced into said zone to effect a partial combustion of said pitch sufficient to maintain the reaction chamber at a temperature adequate to effect a rapid decomposition of said pitch into a decomposition gas rich in hydrogen and removing the decomposition gas from the reaction zone.

5. The invention defined in claim 4 wherein a finely-divided catalyst for decomposing said hydrocarbons is introduced into the stream of residue passing through the reaction zone.

CHARLES E. HEMMINGER.